United States Patent
Shirakami et al.

(10) Patent No.: US 10,556,397 B2
(45) Date of Patent: Feb. 11, 2020

(54) EXTERIOR PANEL AND MANUFACTURING METHOD OF EXTERIOR PANEL

(71) Applicant: NIPPON STEEL CORPORATION, Tokyo (JP)

(72) Inventors: Satoshi Shirakami, Tokyo (JP); Yoshiaki Nakazawa, Tokyo (JP); Nobutaka Shimizu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/470,947

(22) PCT Filed: Dec. 12, 2017

(86) PCT No.: PCT/JP2017/044530
§ 371 (c)(1),
(2) Date: Jun. 18, 2019

(87) PCT Pub. No.: WO2018/123560
PCT Pub. Date: Jul. 5, 2018

(65) Prior Publication Data
US 2019/0337259 A1 Nov. 7, 2019

(30) Foreign Application Priority Data
Dec. 27, 2016 (JP) ................................. 2016-252351

(51) Int. Cl.
*B62D 29/00* (2006.01)
*B62D 29/04* (2006.01)
(Continued)

(52) U.S. Cl.
CPC .............. *B32B 3/28* (2013.01); *B21D 47/04* (2013.01); *B21D 53/88* (2013.01); *B62D 25/02* (2013.01); *B62D 29/005* (2013.01); *B62D 29/04* (2013.01)

(58) Field of Classification Search
CPC ...... B62D 29/04; B62D 29/005; B62D 25/02; B62D 25/06; B62D 25/10; B32B 3/28; B21D 47/04
(Continued)

(56) References Cited

U.S. PATENT DOCUMENTS 3,597,891 A * 8/1971 Martin ................... B62D 29/04
52/145
4,369,608 A * 1/1983 Miura ....................... B32B 3/28
52/309.9
(Continued)

FOREIGN PATENT DOCUMENTS

CN 201660977 U 12/2010
CN 110114208 A 8/2019
(Continued)

OTHER PUBLICATIONS

International Search Report for PCT/JP2017/044530 (PCT/ISA/210) dated Mar. 20, 2018.
(Continued)

*Primary Examiner* — Gregory A Blankenship
(74) *Attorney, Agent, or Firm* — Birch, Stewart, Kolasch & Birch, LLP (57) ABSTRACT

An exterior panel includes: a metal sheet having a curved portion; a resin structure which includes a plurality of tubular bodies having the same length in a central axis direction, top surfaces covering respective one end portions of the tubular bodies, and base portions connecting respective the other end portions of the tubular bodies and is formed with the top surfaces being brought into close contact with and joined to the curved portion of the metal sheet; and a sheet member made of a resin or paper joined to the base portions of the resin structure, in which a relationship between a tensile elastic modulus E (N/mm²) and the thickness t (mm) of the sheet member satisfies Formula (1).

$$4.0 \ (N \cdot mm) < E \times t^3 < 200 \ (N \cdot mm) \quad \text{Formula (1)}$$

20 Claims, 7 Drawing Sheets

(51) Int. Cl.
*B62D 25/02* (2006.01)
*B21D 47/04* (2006.01)
*B32B 3/28* (2006.01)
*B21D 53/88* (2006.01)

(58) Field of Classification Search
USPC .......................................... 296/187.03, 191
See application file for complete search history.

(56) References Cited

U.S. PATENT DOCUMENTS

| | | | | |
|---|---|---|---|---|
| 7,377,580 | B1* | 5/2008 | Ekladyous | B62D 25/105 180/69.21 |
| 7,404,593 | B2* | 7/2008 | Cormier | A62B 1/22 296/187.03 |
| 2002/0017805 | A1* | 2/2002 | Carroll, III | A62B 1/22 296/187.03 |
| 2002/0070584 | A1* | 6/2002 | Carroll, III | B32B 3/28 296/187.03 |
| 2004/0178662 | A1* | 9/2004 | Carroll, III | B60N 2/4249 296/187.03 |
| 2005/0142333 | A1* | 6/2005 | Montagna | B29C 43/146 428/180 |
| 2010/0066121 | A1 | 3/2010 | Gross | |
| 2012/0040131 | A1* | 2/2012 | Speer | B32B 15/08 428/131 |
| 2015/0030814 | A1* | 1/2015 | Ohmori | B60R 13/02 428/178 |
| 2015/0165724 | A1* | 6/2015 | Cox | B21B 1/22 428/573 |
| 2016/0368540 | A1* | 12/2016 | Terada | B29C 43/14 |
| 2019/0106194 | A1* | 4/2019 | Tajiri | B29C 43/56 |
| 2019/0193383 | A1* | 6/2019 | Kien | B32B 37/1292 |

FOREIGN PATENT DOCUMENTS

| | | |
|---|---|---|
| JP | 56-22118 U | 2/1981 |
| JP | 61-146454 U | 9/1986 |
| JP | 5-212477 A | 8/1993 |
| JP | 2001-239960 A | 9/2001 |
| JP | 2003-508270 A | 3/2003 |
| JP | 2013-75451 A | 4/2013 |
| JP | 5350918 B2 | 11/2013 |
| JP | 2015-189146 A | 11/2015 |
| JP | 5808637 B2 | 11/2015 |
| JP | 2016-179583 A | 10/2016 |
| RU | 2560473 C2 | 8/2015 |
| SU | 1221008 A1 | 3/1986 |
| WO | WO 2018/123560 A1 | 7/2018 |

OTHER PUBLICATIONS

Written Opinion of the International Searching Authority for PCT/JP2017/044530 (PCT/ISA/237) dated Mar. 20, 2018.
Chinese Office Action and Search Report for counterpart Chinese Application No. 201780079447.4, dated Oct. 8, 2019, with partial English translation.
Russian Notice of Allowance dated Nov. 6, 2019, issued in Russian Application No. 2019119246.

* cited by examiner

EXTERIOR PANEL AND MANUFACTURING METHOD OF EXTERIOR PANEL

TECHNICAL FIELD OF THE INVENTION

The present invention relates to an exterior panel and a manufacturing method of the exterior panel.

Priority is claimed on Japanese Patent Application No. 2016-252351, filed on Dec. 27, 2016, the content of which is incorporated herein by reference.

RELATED ART

There is a demand for a reduction in the weight of a vehicle to improve fuel economy. Since a frame member of a vehicle is required to have collision safety, there has been an attempt to reduce the amount of steel used by reducing the sheet thickness of a steel sheet while high-strengthening the applied steel sheet. On the other hand, a vehicle panel disposed on the surface of the vehicle body of a vehicle is required to have tensile rigidity (panel rigidity). The tensile rigidity is determined by the Young's modulus and the sheet thickness of a steel sheet to be applied. The Young's modulus of the steel sheet is substantially constant regardless of strength. Therefore, when the sheet thickness of the steel sheet of the vehicle panel is reduced for the purpose of weight reduction, the tensile rigidity is reduced. When the tensile rigidity of the vehicle panel decreases, the vehicle panel easily becomes recessed by receiving a relatively small external force, and the external appearance of the vehicle is significantly deteriorated. For these reasons, there is a demand for a vehicle panel which is lightweight and excellent in tensile rigidity.

Patent Document 1 describes a sheet material (hereinafter, this sheet material is sometimes referred to as a composite structure sheet) which is improved in rigidity by interposing a resin structure between two metal sheets. The resin structure included in the composite structure sheet of Patent Document 1 has a structure in which a plurality of hollow protrusions are formed on the surface of a base portion, a first metal sheet is thermally fusion-bonded to the rear surface of the base portion, and a second metal sheet is thermally fusion-bonded to the top surfaces of the protrusions.

In addition, Patent Document 2 describes a composite structure sheet which is improved in rigidity by bonding first and second metal sheets with an adhesive while a resin structure is interposed therebetween. In the composite structure sheet of Patent Document 2, cylindrical standing bodies are interposed between the metal sheets to form a closed section, and the air pressure in the closed space exceeds 1 atm.

As described above, Patent Documents 1 and 2 describe the composite structure sheets which are lightweight and excellent in rigidity by interposing the resin structure between the two metal sheets. It is described that these composite structure sheets can be used as a vehicle panel which is lightweight and excellent in tensile rigidity.

Furthermore, Patent Document 3 describes a laminated structure panel in which the tensile rigidity of a panel is improved by resin ribs provided integrally with the vehicle inner surface of the panel made of metal.

However, a vehicle panel has a complex shape from the viewpoint of designability, in many cases, a sheet material is formed into a desired shape. For example, there is a vehicle panel which is curved along a first direction and is also curved along a second direction intersecting the first direction. In addition, there is a case where a vehicle panel having a particularly complex shape has a saddle shape in which the curving direction along the first direction and the curving direction along the second direction are opposite to each other. If the exemplary techniques described in Patent Documents 1 and 2 above are applied to such a vehicle panel, due to strain and peeling of the shape of the resin structure caused by deformation during forming, gaps between the metal sheets and the resin structure, and wrinkles and breaks of the metal sheets occur. In other words, there is a concern that the vehicle panel may be broken due to the forming. As a result, the vehicle panel cannot maintain its tensile rigidity. Furthermore, since the rigidity of the composite structure sheet itself is high, it is difficult to form the composite structure sheet into a desired shape. In addition, as a result of the forming, there is a concern that the convex-concave shape of the resin structure may be transferred to the outer metal sheet and the external appearance may be significantly deteriorated.

In the laminated structure of Patent Document 3, the resin ribs are bonded to the inner side of the panel made of metal to improve the tensile rigidity. However, a metal sheet serving as the backing for the ribs is not joined, and the ribs are not reinforced. Therefore, the laminated structure of Patent Document 3 merely improves the tensile rigidity as a whole. That is, the laminated structure of Patent Document 3 has insufficient tensile rigidity for application to a panel for a vehicle outer sheet. Furthermore, it is difficult to process ribs conforming to the complex shape of the panel, and in a case of low dimensional accuracy, there is concern that large wrinkles and strain may occur in the panel, and the external appearance may be significantly deteriorated.

The above-described problems are present not only in an exterior panel of a vehicle but also in an exterior panel of an aircraft or the like.

PRIOR ART DOCUMENT

Patent Document

[Patent Document 1] Japanese Unexamined Patent Application, First Publication No. 2015-189146
[Patent Document 2] Japanese Patent No. 5808637
[Patent Document 3] Japanese Patent No. 5350918

DISCLOSURE OF THE INVENTION

Problems to be Solved by the Invention

The present invention has been made in view of the above circumstances, and an object thereof is to provide an exterior panel having a complex shape and excellent tensile rigidity. Another object of the present invention is to provide a manufacturing method of the exterior panel which can exhibit high tensile rigidity without deterioration of external appearance quality even in a case of having a complex shape.

Means for Solving the Problem

The gist of the present invention for solving the above problems is as follows.

[1] According to a first aspect of the present invention, an exterior panel includes: a metal sheet having a curved portion; a resin structure which includes a plurality of tubular bodies having the same length in a central axis direction, top surfaces covering respective one end portions of the tubular bodies, and base portions connecting respective the other end portions of the tubular bodies and is formed with the top surfaces being brought into close contact with and joined to the curved portion of the metal sheet; and a sheet member made of a resin or paper and joined to the base portions of the resin structure, in which a relationship between a tensile elastic modulus E (N/mm$^2$) and a thickness t (mm) of the sheet member satisfies Formula (1).

$$4.0\ (\text{N·mm}) < Ext^3 < 200\ (\text{N·mm}) \qquad \text{Formula (1)}$$

[2] In the exterior panel according to [1], a relationship between a length h (mm) of the tubular body in the central axis direction, an equivalent circle diameter r (mm) of the top surface, and the thickness t (mm) of the sheet member may satisfy Formulas (2) to (4).

$$5t < h < 50t \qquad \text{Formula (2)}$$

$$5t < r < 50t \qquad \text{Formula (3)}$$

$$0.2 < h/r < 5 \qquad \text{Formula (4)}$$

[3] In the exterior panel according to [1] or [2], a shape of the top surface viewed in the central axis direction of the tubular body may be a circular shape, and the top surfaces may be arranged in a staggered arrangement.

[4] In the exterior panel according to [1] or [2], a shape of the top surface viewed in the central axis direction of the tubular body may be a hexagonal shape, and the top surfaces may be arranged in a densely packed arrangement with constant intervals between the top surfaces.

[5] In the exterior panel according to any one of [1] to [4], the sum of areas of a plurality of the top surfaces may be larger than areas of the base portions.

[6] In the exterior panel according to any one of [1] to [5], a curved portion may be a portion in which both a cross section along a first direction on a sheet surface of the metal sheet and a cross section along a second direction orthogonal to the first direction are curved.

[7] In the exterior panel according to any one of [1] to [6], a relative angle between the central axis direction of the tubular body and a normal direction of the metal sheet at a joining position of the tubular body at a portion where the resin structure of the metal sheet and the sheet member are provided may be 5' or less.

[8] In the exterior panel according to any one of [1] to [7], the sheet member may have a hole formed at a portion which is not in contact with the base portions of the resin structure.

[9] In the exterior panel according to any one of [1] to [8], the exterior panel may be a vehicle panel.

[10] According to a second aspect of the present invention, a manufacturing method of the exterior panel according to any one of [1] to [9], includes: causing an entire surface of base portions of a resin structure including a plurality of tubular bodies having the same length in a central axis direction, top surfaces covering respective one end portions of the tubular bodies, and the base portions connecting respective the other end portions of the tubular bodies, to be brought into close contact with and bonded to a sheet member made of a resin or paper; and causing an entire surface of the top surfaces of the resin structure to which the sheet member is bonded, to be brought into close contact with and bonded to a metal sheet having a curved portion.

[11] In the manufacturing method of the exterior panel according to [10], in the causing of the entire surface of the base portions of the resin structure to be brought into close contact with and bonded to the sheet member, the base portions of the resin structure may be bonded to the sheet member after spreading the sheet member on a flat surface.

[12] In the manufacturing method of the exterior panel according to [10] or [11], an adhesive may be applied to the sheet member bonded to the metal sheet.

[13] In the manufacturing method of the exterior panel according to any one of [10] or [12], a hole may be formed at a portion of the sheet member which is not in contact with the base portions of the resin structure.

[14] According to a third aspect of the present invention, a manufacturing method of the exterior panel according to any one of [1] to [9], includes: disposing, of a composite structure in which an entire surface of base portions of a resin structure including a plurality of tubular bodies having the same length in a central axis direction, top surfaces covering respective one end portions of the tubular bodies, and the base portions connecting respective the other end portions of the tubular bodies is brought into close contact with and bonded to a sheet member made of a resin or paper, the top surfaces to face a metal sheet having a curved portion; and bonding the composite structure to the metal sheet with the entire surface of the top surfaces being brought into close contact with the metal sheet.

[15] In the manufacturing method of the exterior panel according to [14], an adhesive may be applied to the sheet member bonded to the metal sheet.

[16] In the manufacturing method of the exterior panel according to [14] or [15], the sheet member may have a hole formed at a portion which is not in contact with the base portions of the resin structure.

Effects of the Invention

In the exterior panel of the present invention, the top surfaces of the plurality of tubular bodies of the resin structure are joined along the shape of the curved portion of the metal sheet with no gap, and the sheet member is joined to the base portions of the resin structure with no gap. The metal sheet and the sheet member are separated from each other by the length in the central axis direction of the tubular bodies, and the tubular bodies are disposed therebetween. The tubular bodies are restrained by the metal sheet and the sheet member joined on both sides in the central axis direction such that the cross-sectional shape thereof is less likely to be deformed. As a result, deformation and buckling in the central axis direction of the tubular bodies are less likely to occur. Furthermore, since the relative positions of the plurality of tubular bodies are restrained by the metal sheet and the sheet member, deformation in a direction inclined to the central axis of the tubular body is less likely to occur. With such a structure, the tensile rigidity of the exterior panel of the present invention can be improved.

Furthermore, the present inventors found that by using a sheet member in which $Ext^3$ satisfies a predetermined range, the tensile rigidity can be reliably improved without deterioration of the external appearance of the exterior panel. That is, by joining the sheet member in which the tensile elastic modulus and the sheet thickness of the sheet member satisfy the relationship of Formula (1) to the resin structure, the tensile rigidity of the exterior panel can be increased.

Furthermore, by forming the sheet member of a resin or paper, a reduction in the weight of the exterior panel can be achieved compared to a case where a metal sheet is used.

The above is the configuration and effects of the basic exterior panel of the present invention.

Hereinafter, modification examples and effects of the exterior panel of the present invention will be described.

In a case where the relationship between the length (h) in the central axis direction of the resin structure, the equivalent circle diameter (r) of the top surface, and the thickness (t) of the sheet member satisfies Formulas (2) to (4), a vehicle panel having better tensile rigidity can be achieved. Here, the equivalent circle diameter means the diameter of the circumscribed circle of the top surface.

In the exterior panel of the present invention, the tubular body may have a circular shape from the viewpoint of ease of manufacturing. In a case where the tubular bodies are arranged in a staggered arrangement, since the distances between the axes of the tubular bodies are the same, high tensile rigidity can be exhibited in any direction.

In addition, in the exterior panel of the present invention, in a case where the top surface of the tubular body has a hexagonal shape and the top surfaces are arranged in a densely packed arrangement, since the gaps between the tubular bodies are not linearly continuous, the metal sheet is less likely to be bent by an external pressing force, so that high tensile rigidity can be exhibited.

In addition, in a case where the sum of the areas of the plurality of top surfaces is larger than the areas of the base portions, the joining area between the metal sheet and the resin structure can be increased. As a result, the metal sheet and the resin structure can be more firmly joined to each other, so that the tensile rigidity of the exterior panel can be increased. On the other hand, the joining area between the sheet member and the resin structure becomes relatively small. However, the sheet member and the resin structure are joined to each other first during the manufacturing of the exterior panel. Therefore, a suitable joining method can be freely selected, and the joining strength can be further increased. For this reason, there is no problem due to the relative reduction in the joining area between the sheet member and the resin structure.

In a case where the curved portion of the metal sheet has a shape in which both the cross section along the first direction on the sheet surface of the metal sheet and the cross section along the second direction orthogonal to the first direction are curved, the exterior panel can be suitably used as an exterior panel having a complex shape.

The metal panel may have a flat portion in addition to the curved portion.

It is desirable that the relative angle between the central axis direction of the tubular body and the normal direction of the metal sheet at the joining position of the tubular body at the portion where the resin structure of the metal sheet and the sheet member are provided is 5° or less. This is because in a case where the relative angle is 5° or less, most of the tubular bodies are not deformed. Therefore, the tensile rigidity can be increased at the corresponding portion of the exterior panel.

The above is the exterior panel of the present invention and its effect.

Next, the manufacturing method of the exterior panel of the present invention will be described. In the manufacturing method of the present invention, the resin structure and the sheet member are bonded together first, and then the resin structure to which the sheet member is bonded is bonded to the metal panel having the curved portion. In the manufacturing performed in this order, there is no deformation as a composite structure, so that a panel having a composite structure can be manufactured without causing strain of the resin structure, peeling between the metal sheet and the resin structure, large wrinkles and breaks of the sheet member.

The above is the basic manufacturing method of the exterior panel of the present invention and its effect.

In the manufacturing method of the exterior panel of the present invention, in a case where the base portions of the resin structure are bonded to the sheet member after spreading the sheet member on a flat surface, for example, on a flat base, the base portions of the resin structure can be bonded to the sheet member with no gap. As a result, the joining strength between the base portions and the sheet member can be increased.

In a case where a material which is likely to wrinkle and break, such as paper, is used as the sheet member, the adhesive may be applied to the sheet member bonded to the metal sheet. Accordingly, it becomes possible to reinforce the sheet member or fix the wrinkles.

EMBODIMENTS OF THE INVENTION

Figure 1:
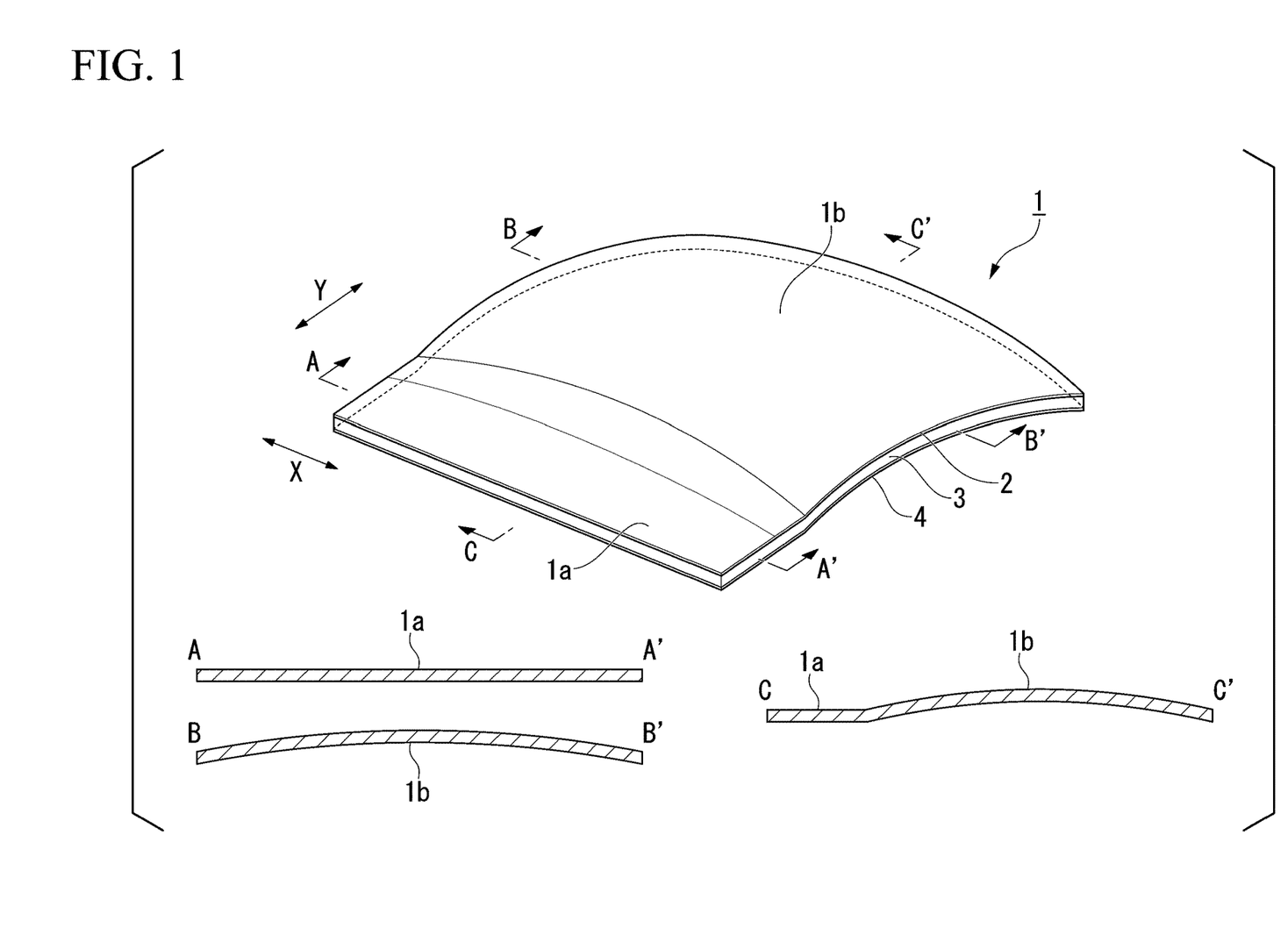
FIG. 1 is a perspective view showing an example of a vehicle panel.

Hereinafter, embodiments of the present invention will be described with reference to the drawings. In the following description, a case of using a vehicle panel as an exterior panel will be provided as an exemplary example. FIG. 1 is a perspective view showing an example of the vehicle panel, FIG. 2 is a partial exploded perspective view of the vehicle panel shown in FIG. 1, and FIG. 3 is a partial sectional view of the vehicle panel shown in FIG. 1.

Figure 2:
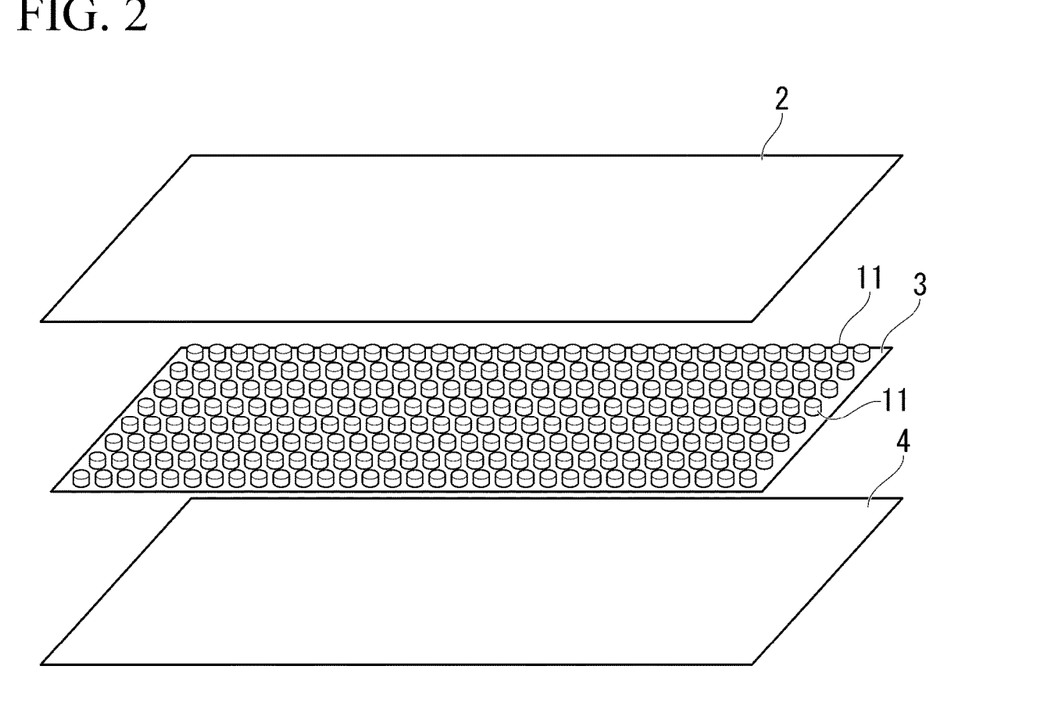
FIG. 2 is a partial exploded perspective view of the vehicle panel shown in FIG. 1.
Figure 3:
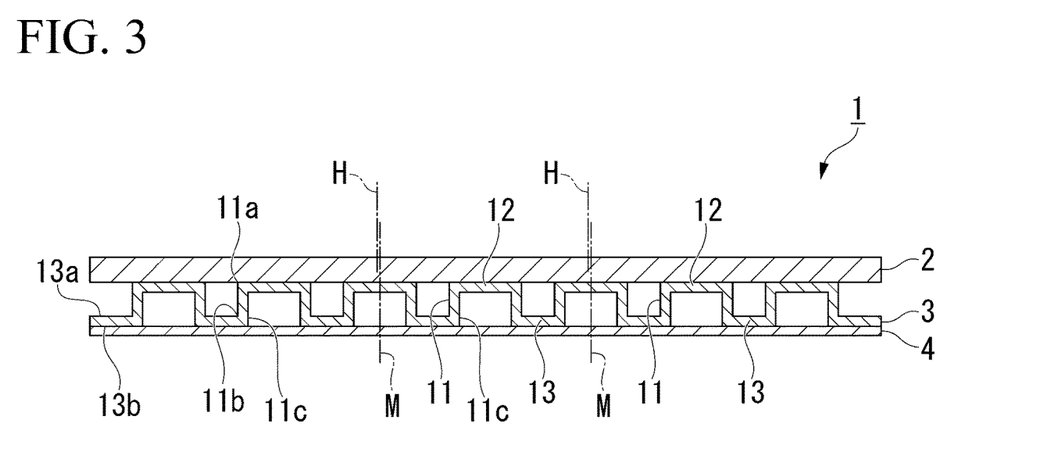
FIG. 3 is a partial sectional view of the vehicle panel shown in FIG. 1.

A vehicle panel 1 shown in FIGS. 1 to 3 is used as an outer sheet of the vehicle body of a vehicle. For example, the vehicle panel 1 is applied to a door panel, a front fender panel, a rear fender panel, a trunk panel, a roof panel, a hood panel, and the like. These members form the exterior shape of the vehicle body and have a shape in which curved portions and flat portions of various shapes are combined.

The vehicle panel 1 shown in FIG. 1 shows an extracted portion including a curved portion and a flat portion. That is, the vehicle panel 1 shown in FIG. 1 includes a flat portion 1a and a curved portion 1b adjacent to the flat portion 1a. The curved portion 1b is a portion in which both cross sections along an X direction and a Y direction in the figure are bent. The curved portion 1b shown in FIG. 1 has a shape in which a metal sheet 2 swells convexly toward the metal sheet 2. However, the present invention is not limited thereto, and the curved portion 1b may also have a shape in which the metal sheet 2 is recessed toward a sheet member 4. In addition, the shape of the metal sheet 2 may be, for example, a saddle shape in which a curving direction along the X direction and a curving direction along the Y direction are opposite to each other.

As shown in FIG. 1, the vehicle panel 1 is constituted by the metal sheet 2, a resin structure 3, and the sheet member 4, and has a structure in which the resin structure 3 is joined to the metal sheet 2 and the sheet member 4 is joined to the resin structure 3. In other words, the resin structure 3 is sandwiched between the metal sheet 2 and the sheet member 4 in the structure. Furthermore, as shown in FIG. 2, the resin structure 3 is provided with a plurality of tubular bodies 11 having the same height as described later, and is disposed such that the top surfaces 12 of the tubular bodies 11 face the metal sheet 2 side.

The metal sheet 2 is a member that forms the vehicle body outer surface of the vehicle panel 1 and forms the exterior shape of the vehicle body when the vehicle panel 1 is attached to the vehicle body of the vehicle. Exemplary examples of the metal sheet 2 include a steel sheet, an aluminum sheet, an aluminum alloy sheet, and the like. The metal sheet 2 is formed into a shape having the curved portion 1b by processing a flat sheet such as a steel sheet by press forming or the like. As described above, the curved portion 1b provided in the metal sheet 2 is, as described above, a portion in which both cross sections along the X direction and the Y direction in the figure are bent in FIG. 1. The metal sheet 2 may have the flat portion 1a in addition to the curved portion 1b.

Although the thickness of the metal sheet 2 is not particularly limited, in a case where the metal sheet 2 is a steel sheet, the thickness thereof is preferably 0.5 mm or less from the viewpoint of weight reduction while the sheet thickness of the steel sheet of a vehicle panel in the related art is about 0.6 to 0.7 mm. On the other hand, the sheet thickness of the steel sheet is preferably 0.1 mm or more from the viewpoint of securing tensile rigidity. In a case where the metal sheet 2 is an aluminum sheet or an aluminum alloy sheet, the sheet thickness is preferably about 0.3 to 1.0 mm similarly in consideration of the current situation.

As shown in FIG. 3, when a central axis M which extends along the height direction of the tubular body 11 through the center of the tubular body 11 is postulated, the resin structure 3 includes the plurality of tubular bodies 11 having the same length in the central axis M direction, the top surfaces 12 which close and cover respective one end portions 11a of the tubular bodies 11, and base portions 13 which connect respective the other end portions 11b of the tubular bodies 11. In addition, as shown in FIG. 3, all the plurality of top surfaces 12 are joined to the metal sheet 2 with no gap. In addition, the sheet member 4 is joined to the base portions 13 with no gap.

Figure 5A:
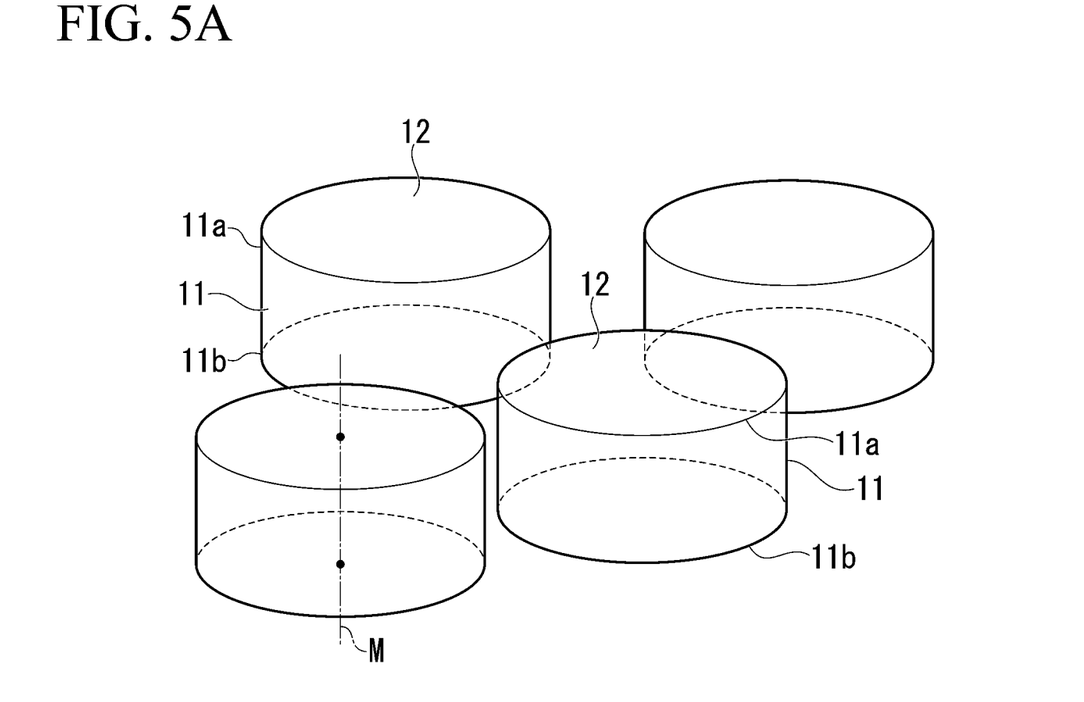
FIG. 5A is a perspective view showing a main part of a resin structure.
Figure 5B:
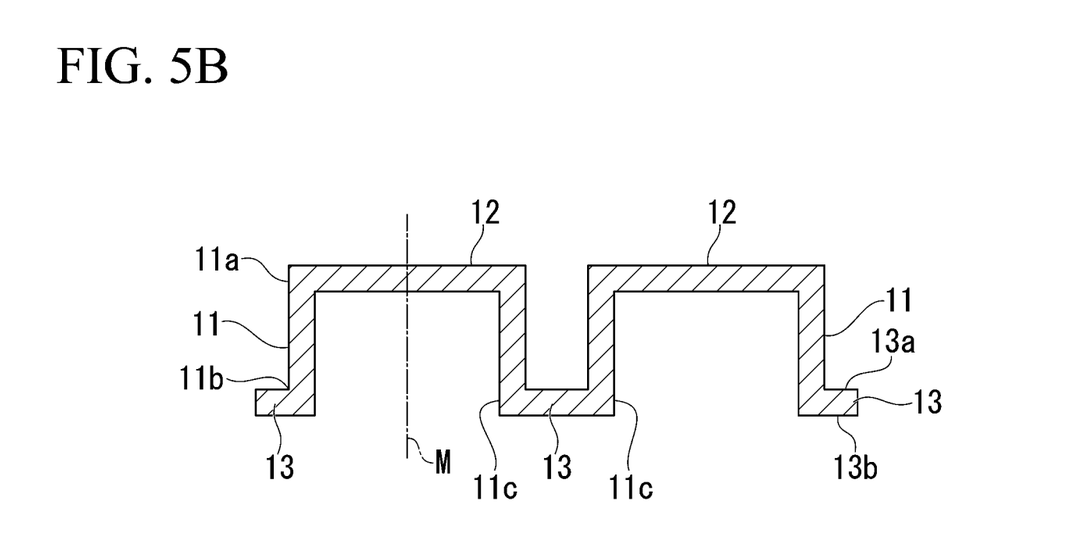
FIG. 5B is a sectional view showing a main part of the resin structure.

As shown in FIGS. 5A and 5B, In the resin structure 3 has a structure in which the tubular bodies 11 having a tubular shape protrude from one surface 13a side of the base portions 13, the top surfaces 12 are disposed on one end portion 11a side of the protruding tubular bodies 11, and the tubular bodies 11 are covered with the top surfaces 12. The base portions 13 are connected to the other end portions 11b of the tubular bodies 11. Since the base portion 13 is provided on the outer circumferential side of the tubular bodies 11 to connect the tubular bodies 11, the other end portions 11b of the tubular bodies 11 are not closed by the base portions 13 and have opening parts 11c. Therefore, as shown in FIG. 5B, in the resin structure 3 in a state in which the sheet member 4 is not joined, the internal spaces of the tubular bodies 11 meet the other surface 13b side of the base portions 13. As shown in FIG. 3, the opening parts 11c of the tubular bodies 11 are closed by joining the sheet member 4 to the resin structure 3.

In addition, the shape of the opening part 11c viewed in the central axis M direction (hereinafter, sometimes referred to as a planar shape) is substantially the same as or similar to the planar shape of the top surface 12. Furthermore, the central axis M direction of the tubular body 11 is substantially coincident with the normal direction of the base portion 13. Therefore, when the tubular body 11 of the resin structure 3 is viewed in a plan view, the projection position of the top surface 12 substantially overlaps the opening part 11c. This positional relationship is preferably maintained as it is even in a case where the resin structure 3 is disposed between the metal sheet 2 and the sheet member 4.

Figure 4:
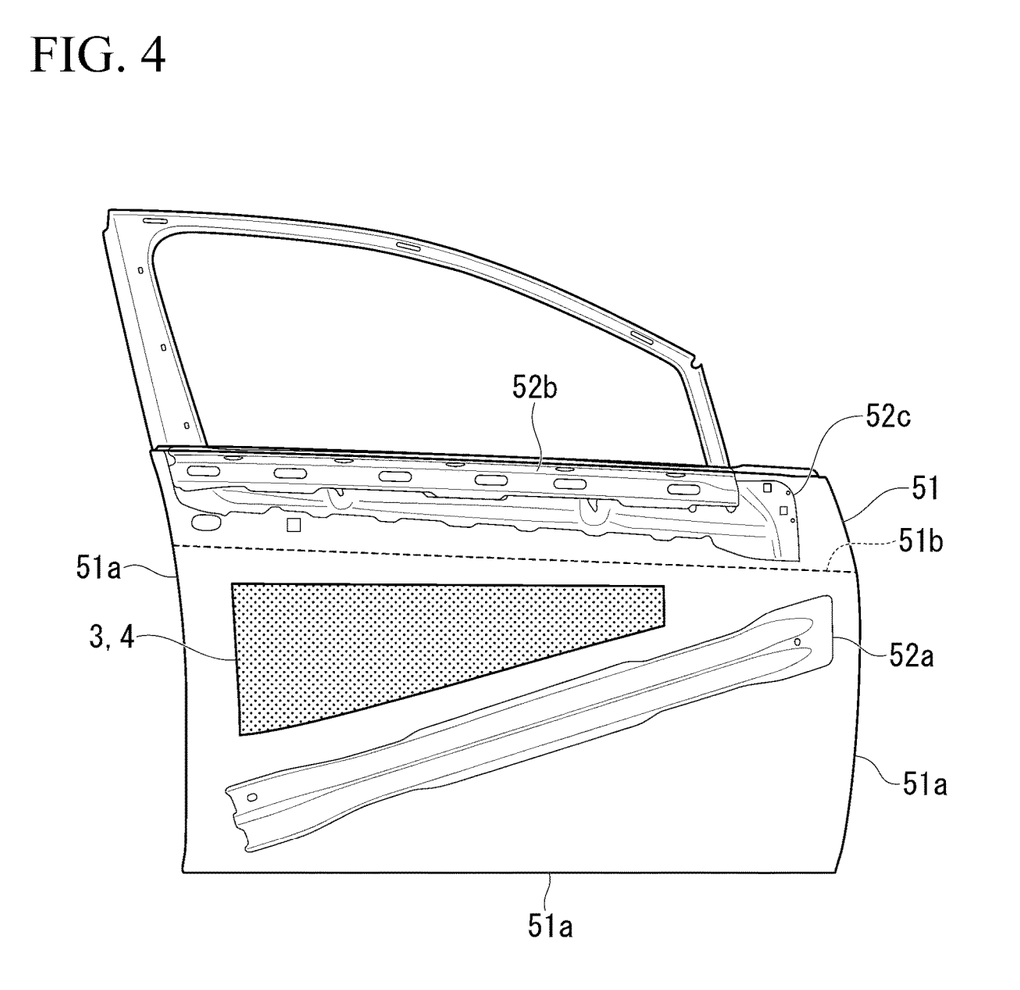
FIG. 4 is a schematic view showing an example in which the vehicle panel of the present invention is applied to a door panel of a vehicle.

The vehicle panel 1 of this embodiment is not limited to the bonding of the resin structure 3 and the sheet member 4 to the entire surface of the metal sheet 2, for example, as shown in FIG. 4, the resin structure 3 and the sheet member 4 may be bonded to a portion of a door panel 51 (metal sheet) of the vehicle. In the example shown in FIG. 4, since the tensile rigidity in the vicinity of an edge portion Ma, a character line 51b, and reinforcing materials 52a, 52b, and 52c of the door panel 51 is high, the vehicle panel is configured by bonding the resin structure 3 and the sheet member 4 to regions other than these.

Figure 6:
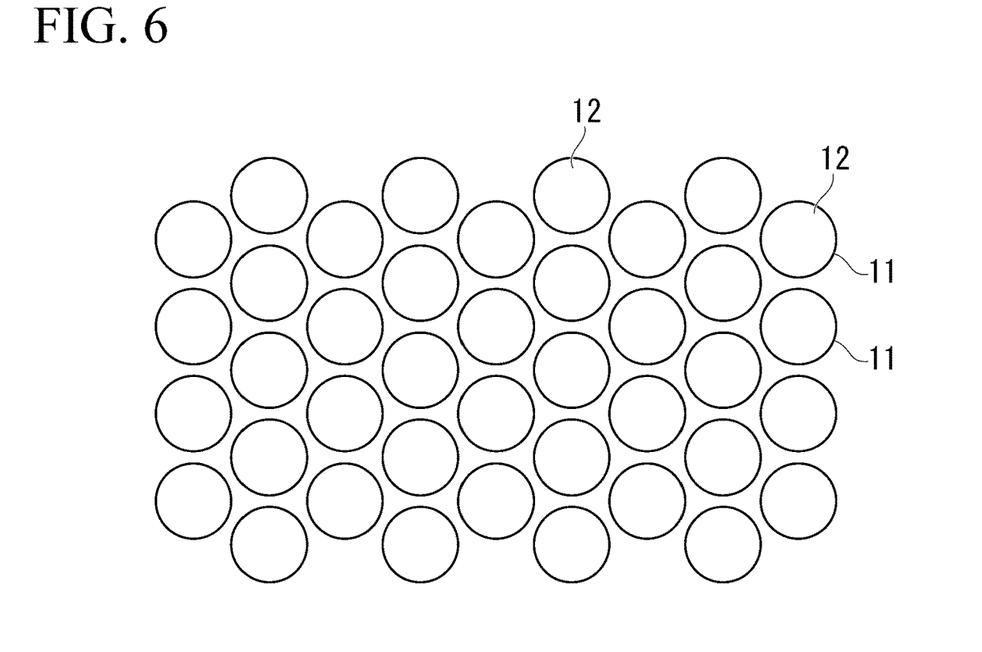
FIG. 6 is a plan view showing a main part of an example of the resin structure.

As shown in FIG. 6, it is desirable that the planar shape (the shape viewed in the central axis M direction) of the top surface 12 of the resin structure 3 is a circular shape from the viewpoint of ease of manufacturing. In addition, it is preferable that the top surfaces 12 are arranged in a staggered arrangement. The planar exterior shape of the tubular body 11 of the resin structure 3 in FIG. 6 in the plan view is the same circular shape as the top surface 12.

In a case where the top surfaces 12 are arranged in a staggered arrangement as shown in FIG. 6, since the distances between the axes of the tubular bodies are the same, the anisotropy is small, and high tensile rigidity can be exhibited in any direction.

Figure 7:
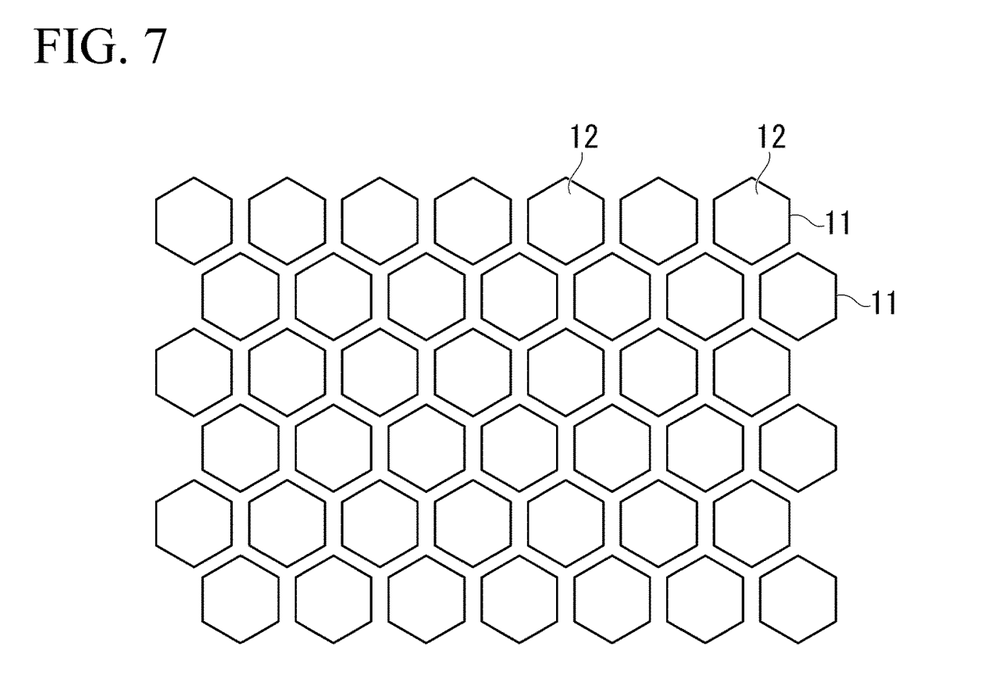
FIG. 7 is a plan view showing a main part of another example of the resin structure.

As another example, as shown in FIG. 7, the planar shape (the shape viewed in the central axis M direction) of the top surface 12 of the resin structure 3 may be a hexagonal shape. It is preferable that the top surface 12 in this case are arranged in a densely packed arrangement with constant intervals therebetween. The exterior shape of the tubular body 11 of the resin structure shown in FIG. 7 is the same hexagonal shape as the top surface 12.

As shown in FIG. 7, in a case where the top surfaces 12 are arranged in a densely packed arrangement, since the distances between the axes of the tubular bodies are the same, the anisotropy is small, and high tensile rigidity can be exhibited in any direction. Furthermore, since the gaps between the tubular bodies 11 are not linearly continuous, the metal sheet 2 is less likely to be bent by an external pressing force.

The material of the resin structure 3 is a synthetic resin. As the synthetic resin, thermosetting resins (phenol resins, epoxy resins, polyurethanes, and the like), and thermoplastic resins (general-purpose plastics, engineering plastics, and super engineering plastics) are exemplary examples. As the general-purpose plastics, polyethylene, polypropylene, polyurethane, and the like are exemplary examples. As the engineering plastics, polycarbonate, polyamide, polyester, and the like are exemplary examples. As the super engineering plastics, PPS, PTFE, PEEK, and the like are exemplary examples.

The sheet member 4 is a sheet-like member made of a resin or paper and is a flexible member that is relatively easily elastically deformed. As shown in FIG. 3, the sheet member 4 is joined to the other surfaces 13b of the base portions 13 of the resin structure 3 with no gap.

The thickness of the sheet member 4 may be 0.15 mm or more. When the thickness of the sheet member 4 is less than 0.15 mm, the tubular bodies 11 cannot be sufficiently restrained, and as a result, the tensile rigidity becomes insufficient, which is not preferable. In addition, the thickness of the sheet member 4 may be 0.35 mm or less. When the thickness exceeds 0.35 mm, the sheet member 4 is less likely to be deformed, and there is concern that it may become difficult to bond the resin structure 3 to the metal sheet 2 together with the sheet member 4 when the vehicle panel is manufactured. Furthermore, the vehicle panel 1 is attached to the vehicle body of the vehicle and is thus easily exposed to heat. Therefore, the sheet member 4 preferably has a heat resisting temperature of 80° C. or more.

Specific examples of the material of the sheet member 4 include the synthetic resin exemplified by the material of the resin structure 3 and paper such as cardboard. Furthermore, in addition to reinforcement, the paper may be impregnated with a resin in order to prevent deterioration due to inundation or the like.

It is preferable that the metal sheet 2 and the resin structure 3, and the resin structure 3 and the sheet member 4 are respectively joined to each other with an adhesive. The kind of the adhesive is not particularly limited.

In addition, a method of joining the members is not limited to adhesion. The resin structure 3 may be thermally fusion-bonded to the metal sheet 2, and the resin structure 3 and the sheet member 4 may be thermally fusion-bonded to each other.

As shown in FIG. 3, the metal sheet 2 and the sheet member 4 are maintained at the length in the central axis M direction of the tubular body 11 by the resin structure 3. In addition, the sheet member 4 is joined to the base portions 13 of the resin structure 3 and the top surfaces 12 at one end portions 11a of the tubular bodies 11 are joined to the metal sheet 2 with no gap such that the tubular bodies 11 are restrained by the sheet member 4 and the metal sheet 2 and are less likely to deform when the tubular bodies 11 receive an external load. As a result, the tensile rigidity of the vehicle panel 1 of this embodiment is enhanced. In addition, although the cross section of the flat portion 1a of the vehicle panel 1 is shown in FIG. 3, since the top surfaces 12 and the base portions 13 of the resin structure 3 are joined to the metal sheet 2 and the sheet member 4 with no gap also in the curved portion 1b, the tensile rigidity of the metal sheet 2 can be increased similarly to the flat portion 1a.

In addition, as shown in FIG. 3, it is preferable that the projection position of the top surface 12 substantially overlaps the opening part 11c when the tubular body 11 of the resin structure 3 is viewed in a plan view in a state in which the resin structure 3 is disposed between the metal sheet 2 and the sheet member 4. As shown in FIG. 3, the axis extending along the height direction of the tubular body 11 through the center of the top surface 12 and the opening part 11c is defined as the central axis M. It is preferable that the relative angle between the central axis M direction and a normal direction H of the metal sheet 2 at the joining position of the tubular body 11 is 5° or less. That is, it is preferable that the central axis of the tubular body is not bent or inclined. FIG. 3 shows a state in which the relative angle between the central axis M direction and the normal direction H is 0°. This is preferably applied to not only the flat portion 1a but also the curved portion 1b in the same manner. In this case, the tensile rigidity at a portion where the resin structure 3 and the sheet member 4 of the vehicle panel 1 are provided can be increased even in the curved portion 1b without deformation of the three-dimensional shape of the tubular body 11.

For example, in the example of FIG. 4, the tensile rigidity of a portion where the resin structure 3 and the sheet member 4 are partially provided on the door panel 51 can be increased. Deformation of the tubular body 11 refers to a state in which the central axis M direction and the normal direction H of the metal sheet 2 deviate from each other by a relative angle of more than 5°. In this case, the tubular body 11 is buckled and deformed, and the projection position of the top surface 12 when the top surface 12 of the resin structure 3 is viewed in a plan view deviates from the position of the opening part 11c, so that the tensile rigidity cannot be improved.

Next, the reason for limiting the numerical values of the present invention will be described.

In the sheet member 4 of the vehicle panel 1 according to this embodiment, the relationship between the tensile elastic modulus E (N/mm$^2$) and the thickness t (mm) satisfy Formula (1). The tensile elastic modulus in this embodiment is the slope in the elastic region of the stress-strain curve of the sheet member 4 obtained by performing a uniaxial tension test.

$$4.0 \text{ (N·mm)} < E \times t^3 < 200 \text{ (N·mm)} \quad \text{Formula (1)}$$

The present inventors found that by using the sheet member 4 in which $E \times t^3$ satisfies a predetermined range, the tensile rigidity can be reliably improved without deterioration of the external appearance quality of the vehicle panel 1 having a complex shape. The tensile elastic modulus (E) is the increment of the tensile stress with respect to the strain given to a material in the elastic limit, and the degree of elastic deformation decreases as this value increases. When $E \times t^3$ obtained by multiplying the tensile elastic modulus (E) of the sheet member 4 by the cube of the sheet thickness t is 4.0 or less, the restraint force of the sheet member 4 on the tubular bodies 11 decreases, so that the tensile rigidity of the vehicle panel 1 is insufficient. On the other hand, when $E \times t^3$ is 200 or more, the rigidity of the sheet member 4 itself is too high, the sheet member 4 is less likely to be deformed, so that it becomes difficult to bond the sheet member 4 to the metal sheet 2 having the curved portion 1b together with the resin structure 3 with no gap. In a case where a metal sheet is used instead of the sheet member 4 as in the related art, since the tensile elastic modulus (E) of the metal sheet is very large, $E \times t^3$ greatly exceeds 200, and the tensile rigidity is significantly improved. However, it is difficult to bring such a metal sheet having high tensile elastic modulus into close contact with the metal sheet 2 having the curved portion 1b via the resin structure 3, and as a result, the improvement of the tensile rigidity cannot be expected. Since the vehicle panel 1 of this embodiment uses the sheet member 4 in which Ext³ is less than 200, the effect of improving the tensile rigidity is small compared to a case where the metal sheet in the related art is used as the reinforcing material of the resin structure. However, in consideration of the magnitude of the tensile rigidity required for the vehicle panel 1, the effect of improving the tensile rigidity in the application of the vehicle panel is sufficient as long as Ext³ is more than 4.0 and less than 200.

Next, in the resin structure 3 and the sheet member 4 of the vehicle panel 1 of this embodiment, the relationship between the height h (mm) of the tubular body 11, the equivalent circle diameter r (mm) of the top surface 12, and the thickness t (mm) of the sheet member 4 preferably satisfies Formulas (2) to (4).

$$5t < h < 50t \quad \text{Formula (2)}$$

$$5t < r < 50t \quad \text{Formula (3)}$$

$$0.2 < h/r < 5 \quad \text{Formula (4)}$$

When the height h of the tubular body 11 is equal to or less than the lower limit of Formula (2), the distance between the metal sheet 2 and the sheet member 4 is small, the second moment of area of the vehicle panel 1 decreases, and the tensile rigidity of the vehicle panel 1 is insufficient. Furthermore, the rigidity of the tubular body 11 increases, and the resin structure 3 cannot be joined to the metal sheet 2 having the curved portion 1b with no gap. When the height h of the tubular body 11 is equal to or more than the upper limit of Formula (2), the tubular body 11 is likely to buckle, and the tensile rigidity of the vehicle panel 1 is insufficient.

Furthermore, when the equivalent circle diameter r of the top surface 12 is equal to or less than the lower limit of Formula (3), the adhesion force between the top surface 12 and the metal sheet 2 becomes small, so that the tensile rigidity of the vehicle panel 1 is insufficient. Furthermore, the rigidity of the top surface 12 increases, and the resin structure 3 cannot be joined to the metal sheet 2 having the curved portion 1b with no gap. When the equivalent circle diameter r of the top surface 12 is equal to or more than the upper limit of Formula (3), the rigidity of the top surface 12 of the tubular body 11 is insufficient, so that the tensile rigidity of the vehicle panel 1 is insufficient.

Furthermore, when the ratio (h/r) of the height h of the tubular body 11 to the equivalent circle diameter r is equal to or less than the lower limit of Formula (4), the second moment of area of the vehicle panel is insufficient, or the wall surface of the tubular body 11 restraining the metal sheet 2 and the sheet member 4 becomes rough, and the tensile rigidity of the vehicle panel 1 is insufficient. On the other hand, when the upper limit of Formula (4) is exceeded, the tubular body 11 is likely to buckle, and the tensile rigidity of the vehicle panel 1 is insufficient.

It is preferable that the sum of the areas of the plurality of top surfaces 12 of the resin structure 3 is larger than the areas of the base portions 13. By causing the sum of the areas of the plurality of top surfaces 12 to be larger than the areas of the base portions 13, the joining area between the metal sheet 2 and the resin structure 3 can be increased, so that the metal sheet 2 and the resin structure 3 can be more firmly joined to each other. As a result, an effect of further improving the tensile rigidity is obtained.

As described above, in a case where the sum of the areas of the plurality of top surfaces 12 of the resin structure 3 is larger than the areas of the base portions 13, the joining area between the sheet member 4 and the resin structure 3 becomes relatively small. However, the sheet member 4 and the resin structure 3 are bonded to each other first when the vehicle panel 1 is manufactured, so that a suitable joining method can be freely selected, and the joining strength can be further increased. For this reason, there is no problem due to the relative reduction in the joining area between the sheet member 4 and the resin structure 3.

Next, a manufacturing method of the vehicle panel of this embodiment will be described. The manufacturing method of this embodiment includes a first bonding step and a second bonding step. Hereinafter, each step will be described with reference to the drawings.

(First Bonding Step)

Figure 8:
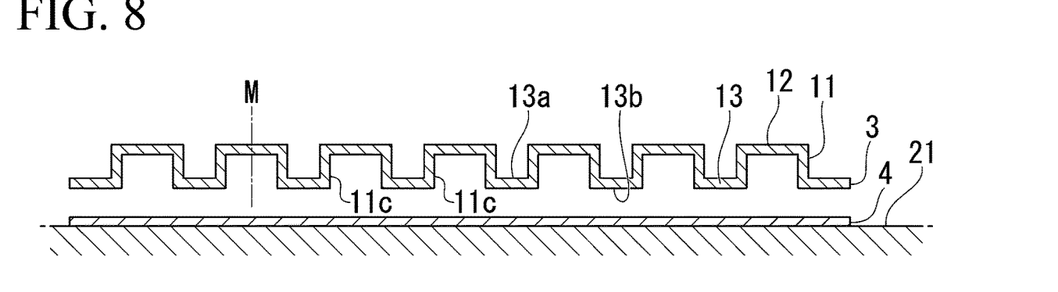
FIG. 8 is a schematic view showing a first bonding step in a manufacturing method of the vehicle panel.
Figure 9:
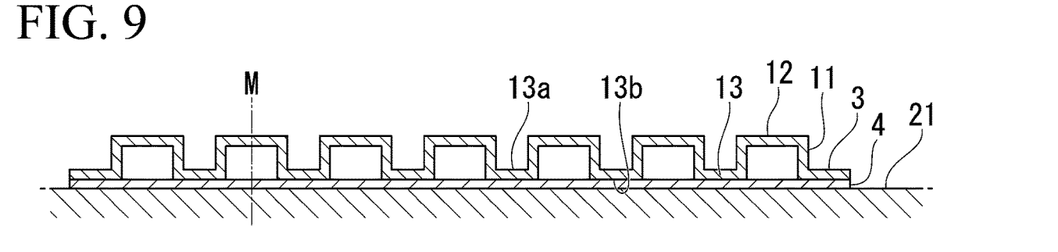
FIG. 9 is a schematic view showing the first bonding step in the manufacturing method of the vehicle panel.

In the first bonding step, the resin structure 3 is bonded to the sheet member 4. First, as shown in FIG. 8, the sheet member 4 is spread on a flat base 21. Next, an adhesive is applied to the other surfaces 13b of the base portions 13 of the resin structure 3. Then, as shown in FIG. 9, the resin structure 3 is bonded onto the sheet member 4. During the bonding, the resin structure 3 and the sheet member 4 are brought into complete contact with each other so that no gap is formed between the base portions 13 and the sheet member 4. By joining the base portions 13 of the resin structure 3 to the sheet member 4, the other end portions 11b of the tubular bodies 11 are closed by the sheet member 4. The method of bonding the resin structure 3 and the sheet member 4 to each other is not particularly limited, and for example, a method of sandwiching the resin structure 3 and the sheet member 4 between two rolls so as to be sequentially joined to each other, or a method of applying pressure using a die may be used. Although an example using an adhesive has been described in the description, the present invention is not limited to the adhesive, and the resin structure 3 and the sheet member 4 may be joined to each other by thermal fusion-bonding.

(Second Bonding Step)

Figure 10:
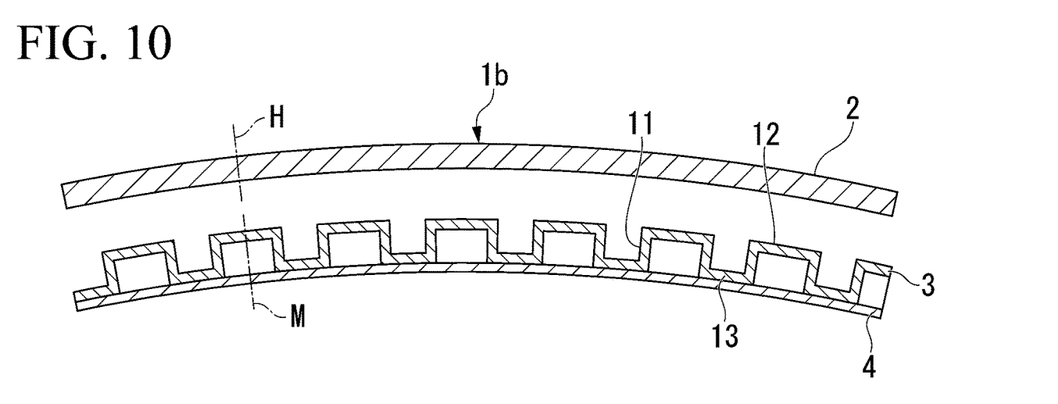
FIG. 10 is a schematic view showing a second bonding step in the manufacturing method of the vehicle panel.
Figure 11:
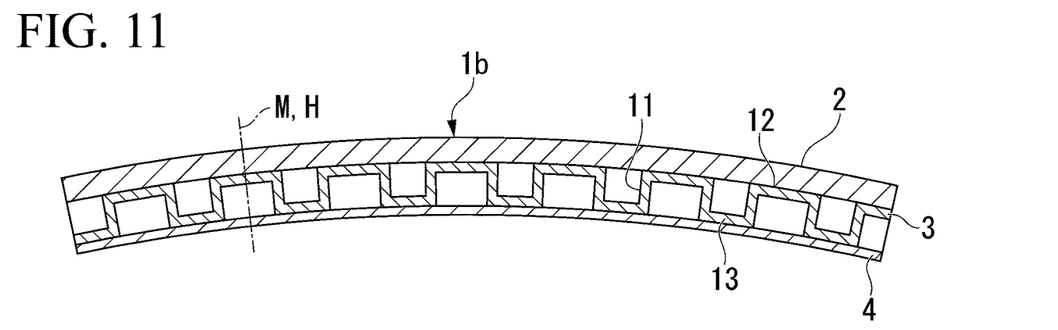
FIG. 11 is a schematic view showing the second bonding step in the manufacturing method of the vehicle panel.

In the second bonding step, the resin structure 3 to which the sheet member 4 is bonded is bonded to the metal sheet 2 having the curved portion 1b. As the metal sheet 2, a metal sheet formed in advance into a predetermined shape by press working or the like is used. In order to bond the resin structure 3, to which the sheet member 4 is bonded, to the metal sheet 2, an adhesive is applied to the top surfaces 12 of the resin structure 3, and as shown in FIG. 10, the resin structure 3 and the sheet member 4 are deformed according to the shape of the metal sheet 2. Next, as shown in FIG. 11, the resin structure 3 together with the sheet member 4 is bonded to the metal sheet 2. During the bonding, the resin structure 3 and the metal sheet 2 are brought into complete contact with each other so that no gap is formed between all the top surfaces 12 and the metal sheet 2. Accordingly, the top surfaces 12 and the metal sheet are in surface contact with each other and joined together, so that it is possible to suppress peeling of the joint. In addition, in this step, the resin structure 3 does not necessarily have to be joined to the metal sheet 2 after being deformed, and the resin structure 3 may be bonded to the metal sheet 2 while being deformed according to the shape of the metal sheet 2. Although an example using an adhesive has been described in the description, the present invention is not limited to the adhesive, and the top surfaces 12 of the resin structure 3 and the metal sheet 2 may be joined to each other by thermal fusion-bonding. As a result of the second bonding step, small wrinkles may occur on the sheet member 4. However, this is not a problem in particular as long as large wrinkles do not cross the panel.

In the first bonding step, by bonding the resin structure 3 and the sheet member 4 together, the other end portions 11b of the plurality of tubular bodies 11 of the resin structure 3 are restrained by the sheet member 4. At this time, the top surfaces 12 and the base portions 13 of the tubular bodies 11 and the sheet member 4 remain flexible. Therefore, in the second bonding step, it is possible to appropriately deform the resin structure 3 and the sheet member 4 according to the shape of the metal sheet 2. Therefore, the resin structure 3 together with the sheet member 4 can be joined to the metal sheet 2 with no gap.

In the manufacturing method of this embodiment, the order of bonding is important. Contrary to this embodiment, if the sheet member 4 is bonded to the resin structure 3 after the metal sheet 2 and the resin structure 3 are bonded to each other, the sheet member 4 is bonded to the resin structure 3 while being deformed according to the curved portion 1b, so that large wrinkles easily occur in the sheet member 4 and it becomes difficult to join the sheet member 4 in a state of being in close contact with the resin structure 3. As a result, portions that are not joined remain between the sheet member 4 and the resin structure 3, and it becomes difficult to improve the tensile rigidity of the vehicle panel 1. Therefore, in order to join the sheet member 4 to the resin structure 3 with no gap, it is necessary to perform the bonding in the order described above.

In addition, by first joining the sheet member 4 and the resin structure 3 together, a suitable joining method can be freely selected, and the joining strength between the sheet member 4 and the resin structure 3 can be further increased. Therefore, even if the joining area between the sheet member 4 and the resin structure 3 becomes smaller than the joining area between the metal sheet 2 and the resin structure 3, there is no problem.

In addition, since the vehicle body of the vehicle has a shape that swells toward the outside of the vehicle body and a shape that is recessed toward the inside of the vehicle body, the curved portion 1b of the metal sheet 2 has either a convex shape or a concave shape toward the metal sheet 2.

In order to bring all of the plurality of top surfaces 12 of the resin structure 3 into close contact with the curved portion 1b with no gap, in a case where the curved portion 1b has a convex surface, it is necessary to widen the intervals between the top surfaces 12, and in a case where the curved portion has a concave surface, it is necessary to narrow the intervals between the top surfaces 12. In other words, in order to join the resin structure 3 along the curved portion of the metal sheet 2, it is necessary to cause the height directions of the tubular bodies 11 to be directed in different directions. In response to such a demand, the vehicle panel 1 of this embodiment has gaps caused by the base portions 13 between the tubular bodies 11. Therefore, the height directions of the tubular bodies 11 can be caused to be directed in different directions by deforming the base portions 13 and the sheet member 4. Accordingly, it becomes possible to join all the top surfaces 12 of the plurality of tubular bodies 11 to the curved portion 1b of the metal sheet 2 with no gap.

An adhesive may be applied to the sheet member 4 bonded to the metal sheet. In this case, wrinkles of the sheet member 4 can be fixed. That is, wrinkles are hardened with the adhesive and opening of the wrinkles is suppressed.

As described above, in the vehicle panel 1 obtained by appropriately processing the metal sheet 2, the resin structure 3, and the sheet member 4, the relative angle between the central axis M direction of the tubular body 11 and the normal direction H of the metal sheet 2 at the joining position of the tubular body 11 is 5° or less. Accordingly, the tensile rigidity at a point where the resin structure and the sheet member of the vehicle panel 1 are provided can be increased in not only the flat portion 1a but also the curved portion 1b without deformation of the three-dimensional shape of the tubular body 11.

When the resin structure 3 is joined to the curved portion 1b of the metal sheet 2, as described above, there may be cases where the intervals between the top surfaces 12 and between the tubular bodies 11 are narrowed. Therefore, the intervals between the top surfaces 12 and between the tubular bodies 11 of the resin structure 3 may be appropriately adjusted according to the shape of the curved portion 1b of the metal sheet 2.

In a panel material in the related art, a resin structure is sandwiched between two metal sheets. When a curved portion is to be provided by bending this panel material in the related art, one of the metal sheets cannot conform to the shape of the curved portion, gaps are generated due to peeling between the resin structure and the metal sheet, and there is concern that the tensile rigidity may partially decrease. In addition, there is concern that a tubular body or a protrusion provided in the resin structure at the bent portion may buckle and the relative angle between the central axis direction of the tubular body or protrusion and the normal direction of the metal sheet at the joining position of the tubular body or protrusion may exceed 5°. Contrary to this, the vehicle panel 1 of this embodiment uses the sheet member 4 that satisfies Formula (1) as one of the two sheets sandwiching the resin structure 3 therebetween. Therefore, even if the curved portion 1b is provided entirely or partially in the vehicle panel 1, the resin structure 3 and the sheet member 4 can be bonded to each other without causing gaps to be generated between the joining surfaces therebetween, and large wrinkles and breaks do not occur in the sheet member 4. Furthermore, at a portion where the resin structure 3 and the sheet member 4 of the vehicle panel 1 are provided, the relative angle between the central axis direction of the tubular body 11 and the normal direction H of the metal sheet 2 can be caused to be 5° or less. Therefore, the tensile rigidity of the entire vehicle panel 1 can be reliably enhanced.

As described above, in the vehicle panel 1 of this embodiment, the top surfaces 12 of the plurality of tubular bodies 11 of the resin structure 3 are joined along the shape of the curved portion 1b of the metal sheet 2 with no gap, and the sheet member 4 is joined to the base portions 13 of the resin structure 3 with no gap. As a result, the metal sheet 2 and the sheet member 4 are separated from each other by the length in the central axis direction of the tubular bodies 11, and the tubular bodies 11 are disposed therebetween. The tubular bodies 11 are restrained by the metal sheet 2 and the sheet member 4 and thus are less likely to be formed such that the cross-sectional shape thereof is less likely to be deformed. As a result, deformation and buckling in the central axis direction of the tubular bodies 11 are less likely to occur. Furthermore, since the relative positions of the plurality of tubular bodies 11 are restrained by the metal sheet 2 and the sheet member 4, deformation in a direction inclined to the central axis of the tubular body 11 is less likely to occur. With such a structure, the tensile rigidity of the vehicle panel 1 is improved.

Furthermore, by joining the sheet member 4 in which the tensile elastic modulus and the sheet thickness of the sheet member 4 satisfy the relationship of Formula (1), the tensile rigidity can be reliably improved without deterioration of the external appearance quality of the vehicle panel 1 having a complex shape.

Furthermore, by forming the sheet member 4 of a resin or paper, a reduction in the weight of the vehicle panel 1 can be achieved compared to a case where the sheet member 4 is formed of a metallic sheet.

In addition, by causing the relationship between the length (h) in the central axis direction of the tubular body 11 of the resin structure 3, the equivalent circle diameter (r) of the top surface 12, and the thickness (t) of the sheet member 4 to satisfy Formulas (2) to (4), a vehicle panel having excellent tensile rigidity can be achieved.

In the vehicle panel 1 of this embodiment, since the shape of the top surface 12 of the tubular body 11 viewed in the central axis M direction is a circular shape and the top surfaces 12 are arranged in a staggered arrangement, the distances between the axes of the tubular bodies 11 become the same, the anisotropy is small, and high tensile rigidity can be exhibited in any direction.

In addition, in the vehicle panel 1 of this embodiment, since the shape of the top surface of the tubular body 11 viewed in the central axis M direction is a hexagonal shape and the top surfaces are arranged in a densely packed arrangement, the distances between the axes of the tubular bodies 11 become the same, the anisotropy is small, and high tensile rigidity can be exhibited in any direction. Furthermore, since the gaps between the tubular bodies 11 are not linearly continuous, the metal sheet 2 can be prevented from being bent by an external pressing force, so that high tensile rigidity can be exhibited.

In addition, since the sum of the areas of the plurality of top surfaces 12 is larger than the areas of the base portions 13, the joining area between the metal sheet 2 and the resin structure 3 can be increased, and the metal sheet 2 and the resin structure 3 can be more firmly joined to each other, so that the tensile rigidity of the vehicle panel can be increased. On the other hand, the joining area between the sheet member 4 and the resin structure 3 becomes relatively small. However, the sheet member 4 and the resin structure 3 are joined to each other first during the manufacturing of the vehicle panel 1. Therefore, a suitable joining method can be freely selected, and the joining strength can be further increased. For this reason, there is no problem due to the relative reduction in the joining area between the sheet member 4 and the resin structure 3.

In addition, in a case where the relative angle between the central axis M direction of the tubular body 11 and the normal direction H of the metal sheet 2 at the joining position of the tubular body 11 at a portion of the metal sheet 2 where the resin structure and the sheet member are provided is caused to be 5° or less, most of the tubular bodies 11 are not deformed. Therefore, the tensile rigidity can be increased at the corresponding portion of the vehicle panel 1.

When the tubular bodies 11 form a closed space, the tubular bodies 11 expand or contract due to a change in atmospheric pressure or temperature, and there is concern that adhered portions adjacent to the closed space may be damaged. In order to avoid this, it is desirable that a small hole is formed at a portion in the sheet member 4, which is not in contact with the base portion 13 of the resin structure 3.

The hole may have a size that allows air to pass therethrough. On the other hand, when the size of the hole is large, the strength of the sheet member 4 may be impaired. As a method of forming the hole, a hole may be bored through the sheet member 4 in advance, a hole may be bored after the resin structure 3 and the sheet member 4 are joined to each other, or a hole may be bored after the metal sheet 2 and the resin structure 3 are joined to each other. In a case of applying the adhesive to the sheet member 4 after joining the metal sheet 2 and the resin structure 3 to each other, it is desirable to bore the hole after applying the adhesive so that the hole is not blocked by the adhesive.

Instead of boring the hole, the sheet member 4 may be made of an air-permeable material. Accordingly, application to not only vehicles but also to aircrafts can be achieved.

Next, in the manufacturing method of the vehicle panel 1 of this embodiment, the resin structure 3 and the sheet member 4 are bonded together first, and then the resin structure 3 to which the sheet member 4 is bonded is bonded to the metal sheet 2. By joining the resin structure 3 and the sheet member 4 to the metal sheet 2 having the curved portion 1b in this order, the sheet member 4 can be joined to the resin structure 3 without causing large wrinkles and breaks in the sheet member 4, and the tubular bodies 11 are restrained by the metal sheet 2 and the sheet member 4 joined on both sides of the tubular bodies in the height direction and thus are less likely to be deformed. Accordingly, the vehicle panel 1 having excellent tensile rigidity can be manufactured.

By joining the metal sheet 2, the resin structure 3, the sheet member 4 together in the order described above, all the plurality of top surfaces 12 in the resin structure 3 can be brought into close contact with the metal sheet 2 after bringing the sheet member 4 into close contact with the base portions 13 of the resin structure 3. Accordingly, no gap is generated between the metal sheet 2 and the top surfaces 12 and between the base portions 13 and the sheet member 4 in the curved portion 1b of the metal sheet 2, and the metal sheet 2, the resin structure 3, and the sheet member 4 can be joined together, whereby the vehicle panel 1 having better tensile rigidity can be manufactured.

In addition, in the manufacturing method of the vehicle panel 1 of the present invention, since the base portions 13 of the resin structure 3 are bonded to the sheet member 4 after spreading the sheet member 4 on the flat base 21, the base portions 13 of the resin structure 3 can be bonded to the sheet member 4 with no gap.

Furthermore, a manufacturing method of a vehicle panel according to another aspect of the present invention includes: a step of disposing, of a composite structure in which the entire surface of base portions of a resin structure including a plurality of tubular bodies having the same length in a central axis direction, top surfaces covering respective one end portions of the tubular bodies, and the base portions connecting respective the other end portions of the tubular bodies is brought into close contact with and bonded to a sheet member made of a resin or paper, the top surfaces to face a metal sheet having a curved portion; and a bonding step of bonding the composite structure to the metal sheet with the entire surface of the top surfaces being brought into close contact with the metal sheet.

Even with this manufacturing method, the same effect as the manufacturing method described above can be obtained.

Since the edge of the panel originally has high tensile rigidity, it is preferable that from the viewpoint of weight reduction, the composite structure is bonded to a portion which is 50 mm or more inward away from the edge of the panel.

Experimental Example 1

Next, examples of the present invention will be described.

Figure 12:
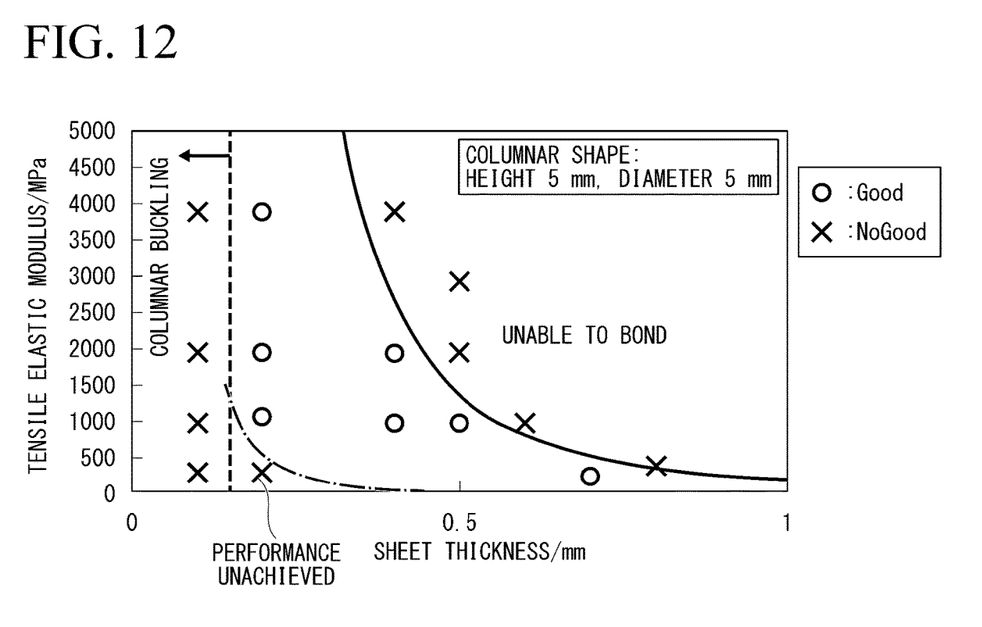
FIG. 12 is a graph showing the relationship between the sheet thickness and the tensile elastic modulus of a sheet member.

A sheet member having a thickness t of 0.1 to 0.8 mm and a tensile elastic modulus E of 200 to 4000 MPa was bonded to a resin structure having the above-described structure in which the diameter of the tubular bodies and the top surfaces was 5 mm and the height of the tubular bodies was 5 mm, via an adhesive. Furthermore, as a metal sheet, a steel sheet having a tensile strength of 270 MPa and a thickness of 0.4 mm was prepared, and the steel sheet was press-formed into a shape having a curved portion having an arcuate cross-sectional shape as viewed in a uniaxial direction. In addition, the resin structure together with the sheet member was bonded to the surface of the steel sheet opposite to the swollen side after the press-forming via an adhesive, thereby manufacturing a vehicle panel. The tensile rigidity of the obtained vehicle panel was evaluated. The results are shown in FIG. 12. FIG. 12 shows Formulas (1-1) and (1-2) which are relational expressions of the tensile elastic modulus E and the sheet thickness t of the sheet member.

$$E=4.0/t^3 \quad \text{Formula (1-1)}$$

$$E=200/t^3 \quad \text{Formula (1-2)}$$

Evaluation of the tensile rigidity was performed as follows. The depression amount of a test piece was evaluated when a spherical indenter with a tip shape having a radius of curvature of 25 mm was pressed against the surface of the swollen side of each sheet member with a force of 100 N. In addition, as a metal sheet, a steel sheet having a tensile strength of 270 MPa and a thickness of 0.7 mm was prepared, the steel sheet was formed into the same shape as each sheet member, and as in the case of each sheet member, the depression amount of the steel sheet when the indenter was pressed against the steel sheet after the forming was measured. The depression amount of the steel sheet after the forming was used as a reference value, and a sheet member showing a depression amount equal to or less than the reference value was evaluated as Good, and a sheet member having a depression amount exceeding the reference value was evaluated as No Good (NG).

Regarding the sheet member that was evaluated as No Good, the deformation state of the resin structure at a portion pressed by the indenter was examined.

The above-described evaluation method is a method capable of accurately evaluating the superiority or inferiority of the tensile rigidity of a vehicle panel which is curved respectively in a first direction and a second direction orthogonal to the first direction.

As shown in FIG. 12, it can be seen that sufficient tensile rigidity for a vehicle panel was exhibited in a range satisfying 4.0 (N·mm)<Ext$^3$<200 (N·mm). On the other hand, when Ext$^3$ became 200 (N·mm) or more, the sheet member became hard, and it was difficult to join the resin structure together with the sheet member to the metal sheet having the curved portion with no gap. When the Ext$^3$ became 4.0 (N·mm) or less, the restraint force of the sheet member on the tubular bodies was insufficient, and the tensile rigidity of the vehicle panel was insufficient.

Experimental Example 2

Figure 13:
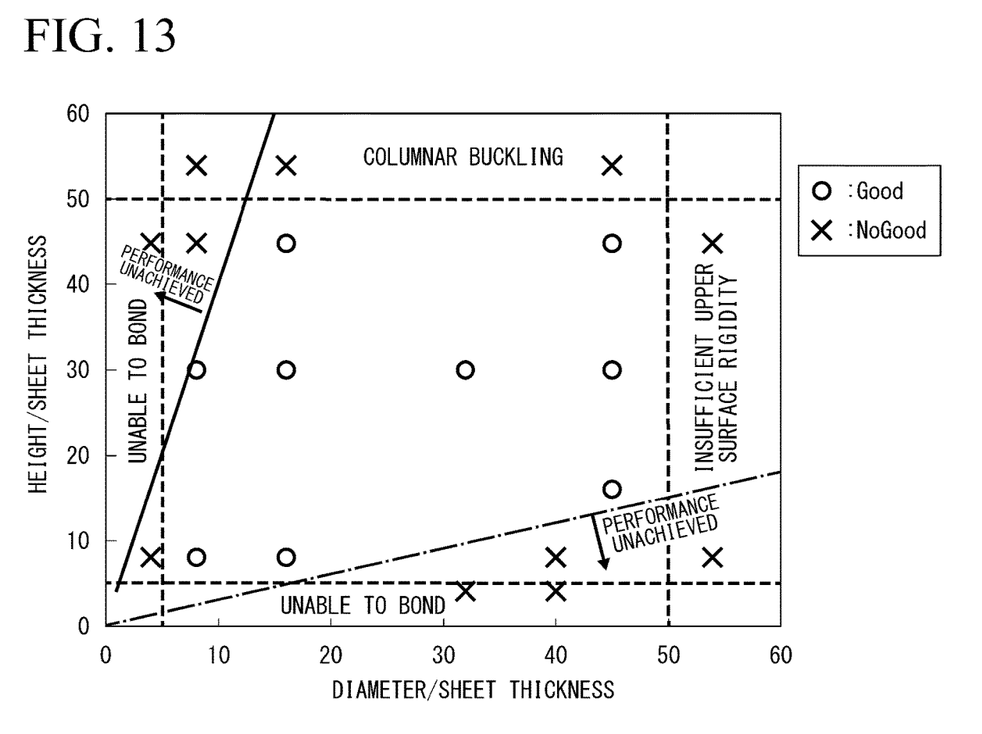
FIG. 13 is a graph showing the relationship between the ratio of the equivalent circle diameter of a top surface of the resin structure to the sheet thickness of the sheet member, and the ratio of the height of a tubular body of the resin structure to the sheet thickness of the sheet member.

Next, a sheet member having a thickness t of 0.2 mm and a tensile elastic modulus E of 1000 MPa was bonded to a resin structure having the above-described structure in which the diameter of the tubular bodies and the top surfaces was 1.6 to 10.8 mm and the height of the tubular bodies was 1.6 to 10.8 mm, via an adhesive. Furthermore, as a metal sheet, a steel sheet having a tensile strength of 270 MPa and a thickness of 0.4 mm was prepared, and the steel sheet was press-formed into a shape having a curved portion as shown in FIG. 1. In addition, the resin structure together with the sheet member was bonded to the steel sheet after the press-forming via an adhesive, thereby manufacturing a vehicle panel. The tensile rigidity of the obtained vehicle panel was evaluated in the same manner as in Experimental Example 1. The results are shown in FIG. 13. FIG. 13 shows the relationship between the ratio of the equivalent circle diameter of the top surface of the tubular body of the resin structure to the sheet thickness of the sheet member, and the ratio of the height of the tubular body of the resin structure to the sheet thickness of the sheet member.

As shown in FIG. 13, in a case where Formulas (2) and (3) were satisfied, desired performance was obtained.

On the other hand, when the height h of the tubular body was 5t or less, the distance between the metal sheet and the sheet member was decreased, and the second moment of area of the vehicle panel was decreased, so that the tensile rigidity of the vehicle panel was insufficient. When the height h of the tubular body was 50t or more, the tubular body was likely to buckle, so that the tensile rigidity of the vehicle panel was insufficient.

In addition, when the equivalent circle diameter r of the tubular body was 5t or less, the adhesion force between the top surface and the metal sheet was decreased, so that the tensile rigidity of the vehicle panel 1 was insufficient. When the equivalent circle diameter r of the tubular body was 50t or more, the rigidity of the top surface was insufficient, so that the tensile rigidity of the vehicle panel was insufficient.

Furthermore, when the ratio (h/r) of the height h of the tubular body to the equivalent circle diameter r was 0.2 or less, the second moment of area of the vehicle panel was insufficient, or the wall surface of the tubular body restraining the metal sheet and the sheet member became rough, so that the tensile rigidity of the vehicle panel was insufficient. When the ratio (h/r) was 5 or more, the tubular body was likely to buckle, so that the tensile rigidity of the vehicle panel 1 was insufficient.

INDUSTRIAL APPLICABILITY

According to the present invention, it is possible to provide an exterior panel having a complex shape and excellent tensile rigidity.

BRIEF DESCRIPTION OF THE REFERENCE SYMBOLS

1: vehicle panel
1b: curved portion
2: metal sheet
3: resin structure
4: sheet member
11: tubular body
12: top surface
13: base portion
H: normal direction
M: central axis

The invention claimed is:
1. An exterior panel comprising:
a metal sheet having a curved portion;
a resin structure which includes a plurality of tubular bodies having the same length in a central axis direction, top surfaces covering respective one end portions of the tubular bodies, and base portions connecting respective the other end portions of the tubular bodies and is formed with the top surfaces being brought into close contact with and joined to the curved portion of the metal sheet; and a sheet member made of a resin or paper and joined to the base portions of the resin structure, a relationship between a tensile elastic modulus E (N/mm$^2$) and a thickness t (mm) of the sheet member satisfies Formula (1)

$$4.0 \text{ (N·mm)} < E \times t^3 < 200 \text{ (N·mm)} \quad \text{Formula (1).}$$

2. The exterior panel according to claim 1,
wherein a relationship between a length h (mm) of the tubular body in the central axis direction, an equivalent circle diameter r (mm) of the top surface, and the thickness t (mm) of the sheet member satisfies Formulas (2) to (4)

$$5t < h < 50t \quad \text{Formula (2)}$$

$$5t < r < 50t \quad \text{Formula (3)}$$

$$0.2 < h/r < 5 \quad \text{Formula (4).}$$

3. The exterior panel according to claim 1,
wherein a shape of the top surface viewed in the central axis direction of the tubular body is a circular shape, and
the top surfaces are arranged in a staggered arrangement.

4. The exterior panel according to claim 1,
wherein a shape of the top surface viewed in the central axis direction of the tubular body is a hexagonal shape, and
the top surfaces are arranged in a densely packed arrangement with constant intervals between the top surfaces.

5. The exterior panel according to claim 1,
wherein a sum of areas of a plurality of the top surfaces is larger than areas of the base portions.

6. The exterior panel according to claim 1,
wherein the curved portion is a portion in which both a cross section along a first direction on a sheet surface of the metal sheet and a cross section along a second direction orthogonal to the first direction are curved.

7. The exterior panel according to claim 1,
wherein a relative angle between the central axis direction of the tubular body and a normal direction of the metal sheet at a joining position of the tubular body at a portion where the resin structure of the metal sheet and the sheet member are provided is 5° or less.

8. The exterior panel according to claim 1,
wherein the sheet member has a hole formed at a portion which is not in contact with the base portions of the resin structure.

9. The exterior panel according to claim 1,
wherein the exterior panel is a vehicle panel.

10. The exterior panel according to claim 2,
wherein a shape of the top surface viewed in the central axis direction of the tubular body is a circular shape, and
the top surfaces are arranged in a staggered arrangement.

11. The exterior panel according to claim 2,
wherein a shape of the top surface viewed in the central axis direction of the tubular body is a hexagonal shape, and
the top surfaces are arranged in a densely packed arrangement with constant intervals between the top surfaces.

12. The exterior panel according to claim 2,
wherein a sum of areas of a plurality of the top surfaces is larger than areas of the base portions.

13. The exterior panel according to claim 3,
wherein a sum of areas of a plurality of the top surfaces is larger than areas of the base portions.

14. A manufacturing method of the exterior panel according to claim 1, the method comprising:
causing an entire surface of base portions of a resin structure including a plurality of tubular bodies having the same length in a central axis direction, top surfaces covering respective one end portions of the tubular bodies, and the base portions connecting respective the other end portions of the tubular bodies, to be brought into close contact with and bonded to a sheet member made of a resin or paper; and
causing an entire surface of the top surfaces of the resin structure to which the sheet member is bonded, to be brought into close contact with and bonded to a metal sheet having a curved portion.

15. The manufacturing method of the exterior panel according to claim 14,
wherein, in the causing of the entire surface of the base portions of the resin structure to be brought into close contact with and bonded to the sheet member, the base portions of the resin structure are bonded to the sheet member after spreading the sheet member on a flat surface.

16. The manufacturing method of the exterior panel according to claim 14,
wherein an adhesive is applied to the sheet member bonded to the metal sheet.

17. The manufacturing method of the exterior panel according to claim 14,
wherein a hole is formed at a portion of the sheet member which is not in contact with the base portions of the resin structure.

18. A manufacturing method of the exterior panel according to claim 1, the method comprising:
disposing, of a composite structure in which an entire surface of base portions of a resin structure including a plurality of tubular bodies having the same length in a central axis direction, top surfaces covering respective one end portions of the tubular bodies, and the base portions connecting respective the other end portions of the tubular bodies is brought into close contact with and bonded to a sheet member made of a resin or paper, the top surfaces to face a metal sheet having a curved portion; and
bonding the composite structure to the metal sheet with the entire surface of the top surfaces being brought into close contact with the metal sheet.

19. The manufacturing method of the exterior panel according to claim 18,
wherein an adhesive is applied to the sheet member bonded to the metal sheet.

20. The manufacturing method of the exterior panel according to claim 18,
wherein the sheet member has a hole formed at a portion which is not in contact with the base portions of the resin structure.

* * * * *